(12) United States Patent
Siguier

(10) Patent No.: US 11,326,375 B2
(45) Date of Patent: May 10, 2022

(54) DOOR HANDLE WITH MEANS FOR REDUCING ULTRA-HIGH-FREQUENCY COMMUNICATION RADIATION

(71) Applicants: Continental Automotive France, Toulouse (FR); Continental Automotive GmbH, Hannover (DE)

(72) Inventor: Grégory Siguier, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 17/311,842

(22) PCT Filed: Dec. 9, 2019

(86) PCT No.: PCT/EP2019/084266
§ 371 (c)(1),
(2) Date: Jun. 8, 2021

(87) PCT Pub. No.: WO2020/120411
PCT Pub. Date: Jun. 18, 2020

(65) Prior Publication Data
US 2022/0025681 A1  Jan. 27, 2022

(30) Foreign Application Priority Data
Dec. 10, 2018  (FR) ...................................... 1872581

(51) Int. Cl.
*B60R 25/00*  (2013.01)
*G05B 19/00*  (2006.01)
(Continued)

(52) U.S. Cl.
CPC .............. *E05B 81/77* (2013.01); *B60R 25/24* (2013.01); *E05B 81/56* (2013.01); *E05B 81/78* (2013.01);
(Continued)

(58) Field of Classification Search
CPC .......... E05B 81/77; E05B 81/56; E05B 81/78; B60R 25/24; B60R 2325/101;
(Continued)

(56) References Cited

U.S. PATENT DOCUMENTS 4,179,700 A * 12/1979 Prestholdt .............. H01Q 1/528
343/787
5,371,509 A * 12/1994 Wallace, Jr. ........... H01Q 1/247
343/700 MS
(Continued)

FOREIGN PATENT DOCUMENTS

JP   3677559 B2   8/2005
JP   3976010 B2   9/2007

OTHER PUBLICATIONS

English Translation of the Written Opinion for International Application No. PCT/EP2019/084266, dated Feb. 13, 2020, 6 pages.
(Continued)

*Primary Examiner* — Quang Pham
(74) *Attorney, Agent, or Firm* — RatnerPrestia

(57) ABSTRACT

A handle for a motor vehicle opening, equipped with an ultra-high-frequency antenna having a device for transmitting and receiving a signal at a predetermined wavelength, with a device for detecting the approach of and/or contact by a user, with a printed circuit board and with at least one connecting cable intended for electrically connecting the printed circuit board to an electronic control unit. The at least one connecting cable has a section either projecting from the remainder of the at least one connecting cable or surrounded by an electromagnetically insulating coating coaxial with the at least one connecting cable, a length of the projecting section or a length of the coaxial coating being equal to one quarter of said predetermined wavelength with a tolerance of +/−20%.

10 Claims, 4 Drawing Sheets

(51) Int. Cl.
*G05B 23/00* (2006.01)
*G06F 7/00* (2006.01)
*G06F 7/04* (2006.01)
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)
*E05B 81/76* (2014.01)
*H01Q 1/32* (2006.01)
*H01Q 7/00* (2006.01)
*E05B 81/56* (2014.01)
*E05B 81/78* (2014.01)
*B60R 25/24* (2013.01)

(52) U.S. Cl.
CPC ......... *H01Q 1/3241* (2013.01); *H01Q 1/3283* (2013.01); *H01Q 7/00* (2013.01); *B60R 2325/101* (2013.01); *B60R 2325/205* (2013.01)

(58) Field of Classification Search
CPC ............ B60R 2325/205; H01Q 1/3241; H01Q 1/3283; H01Q 7/00
See application file for complete search history.

(56) References Cited

U.S. PATENT DOCUMENTS

| | | | | |
|---|---|---|---|---|
| 5,764,193 A * | 6/1998 | Uchino | ............... | H01Q 1/242 343/722 |
| 6,188,297 B1 * | 2/2001 | Akiba | ............... | H01L 23/552 257/E23.114 |
| 6,825,651 B2 * | 11/2004 | Belady | ............... | G01R 15/181 324/127 |
| 7,354,232 B1 * | 4/2008 | Yeaple | ............... | B42D 3/002 412/8 |
| 7,956,818 B1 * | 6/2011 | Hsu | ............... | H01Q 13/203 343/895 |
| 7,977,583 B2 * | 7/2011 | Yaghmai | ............... | H05K 1/0243 174/350 |
| 10,403,964 B2 * | 9/2019 | Yoo | ............... | H01Q 5/371 |
| 2010/0206627 A1 * | 8/2010 | Benner | ............... | H05K 9/0018 174/377 |
| 2010/0237635 A1 * | 9/2010 | Ieda | ............... | G07C 9/00309 292/336.3 |
| 2013/0328692 A1 * | 12/2013 | Johannessen | ............... | G01V 3/12 340/854.4 |
| 2015/0029059 A1 * | 1/2015 | Grossman | ............... | H01Q 7/00 343/702 |
| 2015/0048987 A1 * | 2/2015 | Koyama | ............... | H01Q 9/30 343/790 |
| 2015/0325915 A1 * | 11/2015 | Lyu | ............... | H01Q 5/371 343/843 |
| 2016/0172749 A1 * | 6/2016 | Heng | ............... | H01Q 9/42 343/720 |
| 2017/0194717 A1 * | 7/2017 | Kosaka | ............... | H01Q 9/0435 |
| 2017/0201002 A1 * | 7/2017 | Huggins | ............... | H01Q 1/02 |
| 2017/0214141 A1 * | 7/2017 | Liu | ............... | H01Q 1/48 |
| 2017/0271765 A1 * | 9/2017 | An | ............... | H01Q 7/00 |
| 2018/0300975 A1 | 10/2018 | Oberbeckmann et al. | | |
| 2020/0136224 A1 * | 4/2020 | Moustafa | ............... | H01Q 13/22 |

OTHER PUBLICATIONS

International Search Report and Written Opinion for International Application No. PCT/EP2019/084266 dated Feb. 13, 2020, with partial English translation, 8 pages.

International Search Report and Written Opinion for International Application No. PCT/EP2019/084266, dated Feb. 13, 2020, 12 pages (French).

* cited by examiner

DOOR HANDLE WITH MEANS FOR REDUCING ULTRA-HIGH-FREQUENCY COMMUNICATION RADIATION

CROSS REFERENCE TO RELATED APPLICATIONS

This application is the U.S. National Phase Application of PCT International Application No. PCT/EP2019/084266, filed Dec. 9, 2019, which claims priority to French Patent Application No. 1872581, filed Dec. 10, 2018, the contents of such applications being incorporated by reference herein.

FIELD OF THE INVENTION

The invention relates to a motor vehicle door handle having means for reducing ultra-high-frequency communication radiation, that is to say between 300 MHz and 10 000 MHz. More particularly, the invention applies to an opening handle, advantageously a door handle, comprising means for reducing radiation in communication according to a Bluetooth® standard, communication means being intended to communicate with a portable user device in order to authorize hands-free access to the vehicle, i.e. locking and/or unlocking of the opening.

BACKGROUND OF THE INVENTION

Nowadays, vehicle door handles are equipped with devices for detecting a user's intention to lock or to unlock a vehicle door. Detection of a user's intention to lock/unlock, coupled with recognition of an identifier incorporated in a "hands-free" access device, for example a "hands-free" electronic remote access control fob, or a mobile phone, carried by this user, makes it possible to remotely lock and unlock the openings of the vehicle.

Thus, when the user, carrying the electronic fob or the corresponding phone identified by the vehicle, wishes to unlock the vehicle, he approaches the handle or touches the door handle of the vehicle, and the openings of the vehicle are then automatically unlocked. By approaching or by pressing on a precise location on the door handle of the vehicle, called "unlocking zone", the door (or alternatively all of the openings) is (are) unlocked without any other action by the user.

Conversely, when the user, still carrying the necessary fob identified by the vehicle, wishes to lock his vehicle, he closes the door of his vehicle and he approaches or momentarily presses on another precise location on the handle, called "locking zone". This action makes it possible to lock the openings of the vehicle automatically.

These detection devices generally comprise two capacitive or inductive sensors, in the form of two electrodes electromagnetically connected to a printed circuit and incorporated in the door handle, each in a precise locking or unlocking zone. Generally, one electrode is dedicated to each zone, that is to say one electrode is dedicated to detecting the approach of and/or contact by the hand of the user in the locking zone and one electrode is dedicated to detecting the approach of and/or contact by the hand of the user in the unlocking zone.

According to the prior art, the locking/unlocking detection device further comprises a radio-frequency antenna, for exchanging an identifier between the vehicle and the hands-free access fob or the phone.

This antenna may be of low-frequency (LF) type, for example at 125 kHz.

If the portable device is a mobile phone, radio-frequency and LF communication with the vehicle is not always possible, since most mobile phones do not have any RF, or LF, communication means whose frequencies are compatible with those used during communication with a vehicle, such as the frequencies of 315 MHz and 433.92 MHz for RF and 125 kHz for LF.

However, mobile phones now have ultra-high-frequency communication means, in particular according to a Bluetooth® or Bluetooth Low Energy "BLE" communication standard, that is to say ultra-high-frequency (UHF) communication at 2.4 GHz to 2.48 GHz with low power consumption, but an aspect of the present invention is not limited to such a standard.

This communication standard has the advantage of being universal and therefore does not require any accreditation specific to each country (only a Bluetooth Low Energy international certification), as is the case with the current RF and LF communication standards whose operating frequency differs according to country.

It has therefore been necessary to adapt the "hands-free" access and/or starting system to a vehicle so that it is also able to operate with a mobile phone equipped with the Bluetooth® communication standard and no longer solely by way of radio waves and low-frequency waves (RF, LF).

The advantage of the Bluetooth® communication standard or of Bluetooth Low Energy BLE is that it allows a large communication range of about 100 m around the vehicle for BLE.

Bluetooth® communication therefore has numerous advantages compared to low frequency.

The detection device is connected to an electronic control unit or electronic computer of the vehicle, referred to by the abbreviation ECU for "electronic control unit", and sends it a presence detection signal. The electronic control unit or electronic computer of the vehicle has, previously, identified the user as being authorized to access this vehicle, or alternatively, following receipt of this presence detection signal, the electronic control unit or electronic computer performs this identification.

As explained above, when the "hands-free" access device is a mobile phone, the identifier is exchanged through Bluetooth® communication.

If the electronic computer recognizes the identification code as the one authorizing access to the vehicle, it triggers the locking/unlocking of the door (or of one or all of the openings). If, on the other hand, the electronic computer has not received any identification code or if the received identification code is erroneous, locking or unlocking is not performed.

Such vehicles are therefore equipped with door handles comprising a detection device, itself comprising a high-frequency or ultra-high-frequency (HF or UHF) antenna and two electrodes connected to a microcontroller incorporated in a printed circuit, the two electrodes being supplied with voltage.

FIG. 1 shows a handle 6 for a motor vehicle door 8 that can include a chrome strip on its front face directed toward the outside of the vehicle. The handle 6 comprises a device, denoted by its casing 5, for detecting approach and/or contact comprising an unlocking electrode 10 and locking electrode, which may be in the form of two separate electrodes, these electrodes possibly being capacitive or inductive.

The detection device 5 also comprises an ultra-high-frequency (UHF) antenna 2 of IFA, or "inverted F antenna", type, i.e. an inverted F millimeter antenna. The UHF antenna 2, the locking electrode and the unlocking electrode 10 are each electromagnetically connected to control means, located for example in an electronic circuit 3, in the non-limiting form of a printed circuit board or PCB. A ground plane surface 4 of the printed circuit board is located below the printed circuit board 3.

Multiple embodiments of a UHF antenna 2 are possible.

For example, a high-performance UHF antenna of planar type, alternatively called a "patch" antenna, can be used, that is to say a planar antenna whose radiating element is a generally square or rectangular conductive surface. However, this UHF patch antenna cannot be incorporated into all handles 6 for a motor vehicle door 8 or opening. The reason is that the ultra-high-frequency antenna of planar type is larger and more cumbersome than a low-frequency antenna and, as the handles already comprise many other electronic components, the remaining space allocated to the UHF antenna is often very limited.

Instead, and for the sake of saving space, it is also known practice to use a UHF antenna 2 of IFA or inverted millimeter antenna type. This type of IFA UHF antenna is a monopole antenna that is grounded at one end and energized at an intermediate connection away from the ground connection.

In summary, for the two types of UHF antennas 2, the electromagnetic radiation zone 1a of the UHF antenna 2 around the handle 6 is generally in the shape of an oval, with or without non-emission zones.

The printed circuit board 3 is remotely connected to an electronic control unit on board the motor vehicle by a set of cables 7 that transfer the useful data to the functions of the board 3.

Such a detection device 5, by virtue of its interconnection in the form of cables 7, has the disadvantage of emitting unwanted radiation toward the rear of the door 8, therefore in a direction inside the vehicle. This radiation, symbolized by the oval shape 1be, needs to be reduced in order to be able to ensure the function of vehicle interior/exterior location of the mobile phone serving as portable electronic locking or unlocking fob.

Studies carried out to date show that this unwanted radiation is caused by the cables of the interconnection that run toward the rear of the door.

The problem on which an aspect of the present invention is based is, for a motor vehicle opening handle incorporating a device for detecting the presence of a user by means of ultra-high-frequency communication with a portable device in the possession of the user wishing to lock or unlock the opening, to reduce the radiation from the cables that are intended to be connected to an electronic control unit identifying the user as being authorized to lock or unlock the opening of the vehicle.

SUMMARY OF THE INVENTION

To this end, an aspect of the present invention relates to a handle for a motor vehicle opening, equipped with an ultra-high-frequency antenna having means for transmitting and receiving a signal at a predetermined wavelength, with a device for detecting the approach of and/or contact by a user, with a printed circuit board and with at least one connecting cable intended for electrically connecting the printed circuit board to an electronic control unit, remarkable in that said at least one connecting cable has a section either projecting from the remainder of said at least one connecting cable or surrounded by an electromagnetically insulating coating coaxial with said at least one connecting cable, a length of the projecting section or a length of the coaxial coating being equal to one quarter of said predetermined wavelength with a tolerance of +/−20%.

The inventive step of an aspect of the present invention consisted in detecting unwanted radiation of ultra-high-frequency electromagnetic waves toward the inside of the vehicle, that is to say toward the inner face of the door, produced by at least one connecting cable. It was necessary to reduce this radiation in order in particular to be able to perform the function of interior and exterior location of a portable electronic device capable of receiving and transmitting ultra-high frequency electromagnetic waves, advantageously according to a Bluetooth® standard.

While it was known practice to use a quarter-wavelength line or a quarter-wavelength coating for a connecting cable in order to resolve connecting cable impedance issues, this had never been applied to reducing the radiation from an electrical connecting cable.

The electromagnetic radiation from the connecting cable(s) is greatly reduced, in particular toward the inside of the opening and therefore inside the motor vehicle, this radiation not being able anymore to jam the signals transmitted or received by the ultra-high-frequency antenna and therefore provide for secure opening and closing of the opening associated with the handle.

Advantageously, the section projecting from the remainder of said at least one connecting cable extends at 90° with a range a variation of +/−30° around this value compared to the remainder of said at least one connecting cable, the projecting section forming a loop.

Advantageously, the loop has two branches flattened against each other or two branches having a spacing between them less than one fifth of the predetermined wavelength with a tolerance of +/−20%.

Advantageously, the section projecting from the remainder of said at least one connecting cable is located in a first quarter of the length of said at least one connecting cable starting from the printed circuit board.

Advantageously, said at least one cable comprises a part in the form of a microstrip extending against a face of the printed circuit board, the microstrip incorporating the section projecting from the remainder of said at least one connecting cable.

Advantageously, the electromagnetically insulating coating is a metal sleeve.

Advantageously, the ultra-high-frequency antenna, the device for detecting the approach of and/or contact by a user and the printed circuit board are housed in a sealed casing, the sealed casing and the handle comprising a passage respectively toward the outside of the casing and the outside of the handle for said at least one connecting cable. An aspect of the invention can, however, be implemented for a non-sealed casing, although this is not preferred.

An aspect of the invention also relates to a motor vehicle opening comprising a handle on a face referred to as outer face, the opening comprising automatic locking and unlocking means, remarkable in that the handle is as described above, said at least one connecting cable passing through the opening, the section of said at least one connecting cable being located inside the opening toward its inner face opposite to its outer face or being housed in the handle.

An aspect of the invention also relates to an assembly of an electronic control unit responsible for locking and unlocking at least one opening of a motor vehicle and at least one opening, remarkable in that the opening is as described above, said at least one connecting cable connecting the printed circuit board to the electronic control unit, the automatic locking and unlocking means of the opening being controlled by activation means of the electronic control unit.

An aspect of the invention consists in dictating a specific routing for the connecting cables with a view to reducing their radiation. A significant improvement in the performance of vehicle interior/exterior location of the mobile phone is thus obtained.

Finally, an aspect of the invention relates to a motor vehicle, remarkable in that it comprises such an assembly.

BRIEF DESCRIPTION OF THE DRAWINGS

Other features, aims and advantages of aspects of the present invention will become apparent from reading the detailed description that follows and from examining the appended drawings given by way of non-limiting examples, and in which.

DETAILED DESCRIPTION OF THE PREFERRED EMBODIMENTS

Figure 1:
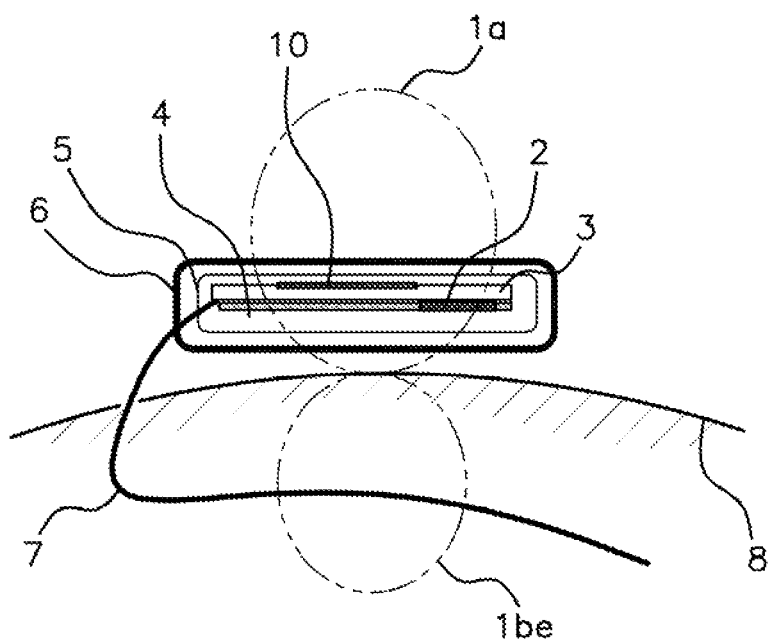
FIG. 1 is a schematic representation of a sectional view of a motor vehicle door having a handle equipped with an ultra-high-frequency antenna, with means for transmitting and receiving a signal at a predetermined wavelength and its internal interconnection to the motor vehicle according to the prior art.
Figure 2:
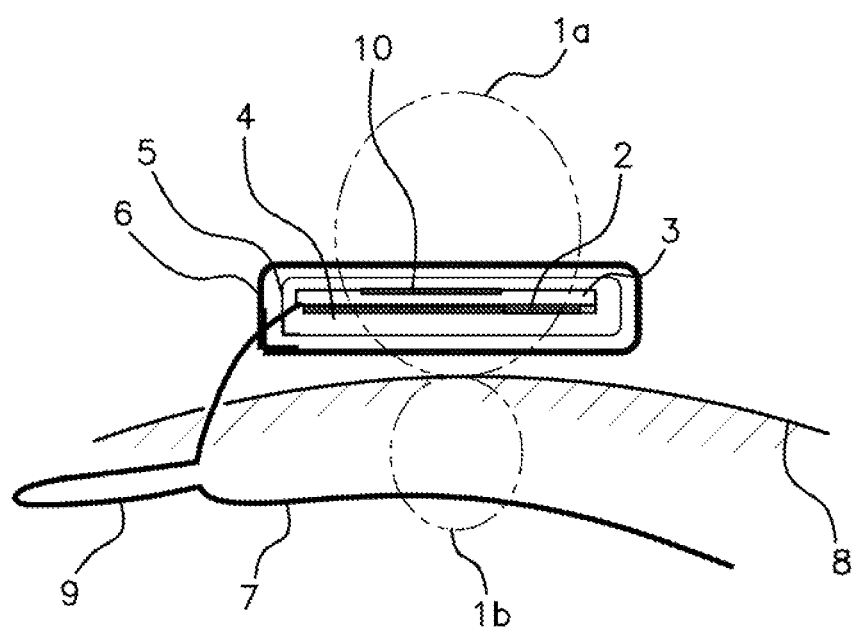
FIG. 2 is a schematic representation of a sectional view of a motor vehicle door having a handle equipped with an ultra-high-frequency antenna, with means for transmitting and receiving a signal at a predetermined wavelength and its internal interconnection to the motor vehicle according to a first embodiment of the present invention, the interconnection comprising a quarter-wave line limiting radiation of electromagnetic waves inside the vehicle.

Referring particularly to FIG. 1, FIG. 2, FIGS. 3a-3C and FIG. 6 and particularly comparing FIG. 1 with FIG. 2, an aspect of the present invention relates to a handle 6 for a motor vehicle opening 8. The opening can be a door 8 of the motor vehicle.

The handle 6 of the opening 8, for detecting an intention to lock/unlock, as mentioned above, is equipped with an ultra-high-frequency antenna 2 having means for transmitting and receiving a signal at a predetermined wavelength $\lambda$. It is known that an electromagnetic wave propagates in a vacuum, at a constant and unsurpassable speed. The wavelength $\lambda$ can be defined as a function of the frequency f of the electromagnetic wave and the speed of light c by:

$$\lambda = c/f \qquad \text{[Math. 1]}$$

Figure 6:
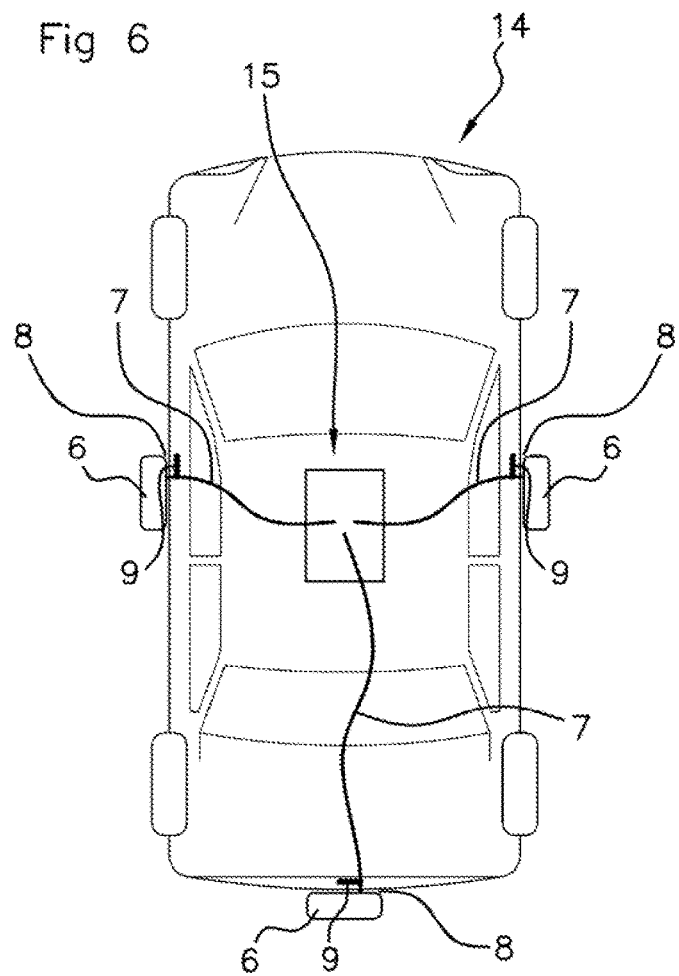
FIG. 6 is a schematic representation of a top view of a motor vehicle, certain openings of which are provided with handles equipped with a device for detecting a locking/unlocking intention with an interconnection to an electronic control unit according to an aspect of the present invention.

The handle 6 of the opening 8 is thus equipped with a device for detecting the approach of and/or contact by a user, a printed circuit board 3 and at least one connecting cable 7, also referred to as interconnection, intended for electrically connecting the printed circuit board 3 to an electronic control unit referenced 15 in FIG. 6. There can in fact be one connecting cable 7 or multiple connecting cables 7, then being in the form of a bundle of cables.

This electronic control unit 15 can be a box referred to as a BCM box also controlling central electronics, an alarm system, the indicators, the hazard lights, the window lifts, the rear window and the heated rear-view mirrors, the interior lighting and the windshield wipers of the motor vehicle.

These features are common to a handle 6 according to the prior art and to a handle 6 according to all embodiments of the present invention.

According to an aspect of the present invention, said at least one connecting cable 7 has a section 9, 9a that carries an element or a shape making it possible to limit the electromagnetic radiation toward the inside of the motor vehicle. In the case of multiple connecting cables 7, at least one cable 7 can carry such a section 9, 9a or this section 9, 9a can be carried by multiple connecting cables 7, for example by all the cables 7.

Figure 3A:
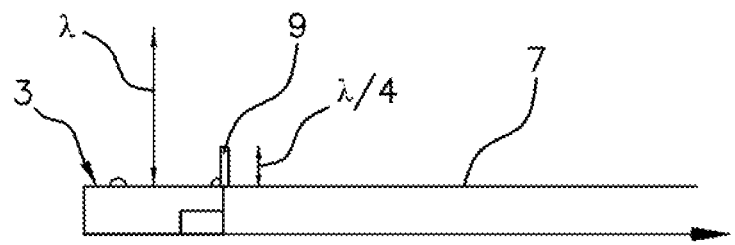
FIG. 3A is a schematic representation of a sectional view of a printed circuit board, an ultra-high-frequency antenna and an interconnection according to the first embodiment, comprising a quarter-wave line in accordance with the present invention.
Figure 3B:
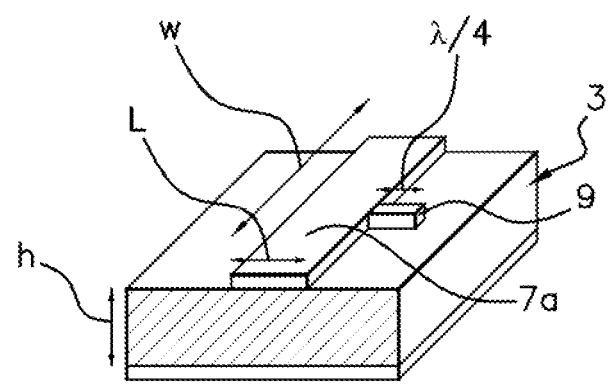
FIG. 3B shows a schematic representation of a perspective view of a circuit board supporting on one face a part of the interconnection in the form of a microstrip having a quarter-wave line as an alternative embodiment according to the present invention to the embodiment shown in FIGS. 2 and 3A.

In a first embodiment of the present invention, as shown in FIG. 2, FIG. 3A and FIG. 3B, the section 9 projects from the remainder of said at least one connecting cable 7. A length of the projecting section 9 is predetermined to be equal to one quarter of said predetermined wavelength $\lambda$, this with a tolerance of +/−20% around this wavelength value.

Figure 3C:
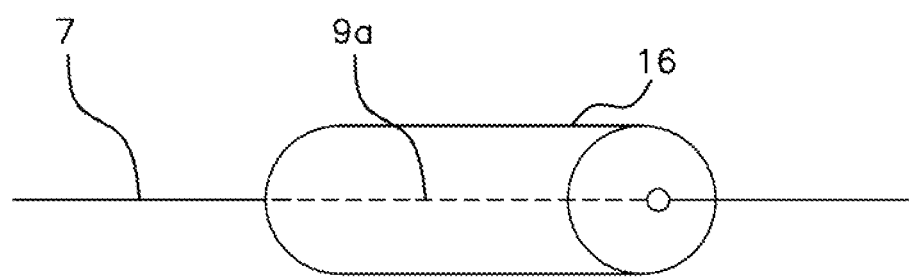
FIG. 3C is a schematic representation of a perspective view of an interconnection section surrounded by an electromagnetically insulating coating according to a second embodiment of an interconnection according to the present invention, the coating representing an alternative to the quarter-wave line shown in FIG. 2, FIG. 3A and FIG. 3B.

In a second embodiment of the present invention, as shown in FIG. 3C, the section 9a is surrounded by an electromagnetically insulating coating 16 coaxial with said at least one connecting cable 7. A length of the section 9a surrounded by the coaxial coating 16 is then equal to one quarter of said predetermined wavelength $\lambda$, this with a tolerance of +/−20% around this wavelength value.

Such a section 9 according to the first embodiment is frequently referred to by the name $\lambda/4$ stub or quarter-wave line. Likewise, such a section 9a surrounded or enveloped by an electromagnetically insulating coating 16 according to the second embodiment is frequently referred to by the name "bazooka balun" or coated section. The use of such means has been known for resolving issues concerning impedance but not emitted radiation.

The technical effect obtained by an aspect of the present invention can be seen by comparing FIG. 1 and FIG. 2. In FIG. 1, the radiation directed toward the outside and the radiation directed toward the inside are respectively symbolized by ovals 1a, 1be and 1b. In FIG. 1, the inner 1be and outer 1a ovals are of substantially the same size while the inner oval 1b of FIG. 2 for a handle 6 according to an aspect of the invention is smaller than the inner oval 1e of FIG. 1.

It should be considered that the ovals 1a, 1be, 1b define the radiation very schematically and that there is radiation outside the ovals 1a, 1be, 1b, the radiation substantially forming a ring around the handle 6.

The second step was to identify that this unwanted radiation directed toward the inside is caused by the cable or cables 7 of the interconnection connecting the printed circuit board 3 to the electronic control unit 15.

Figure 5:
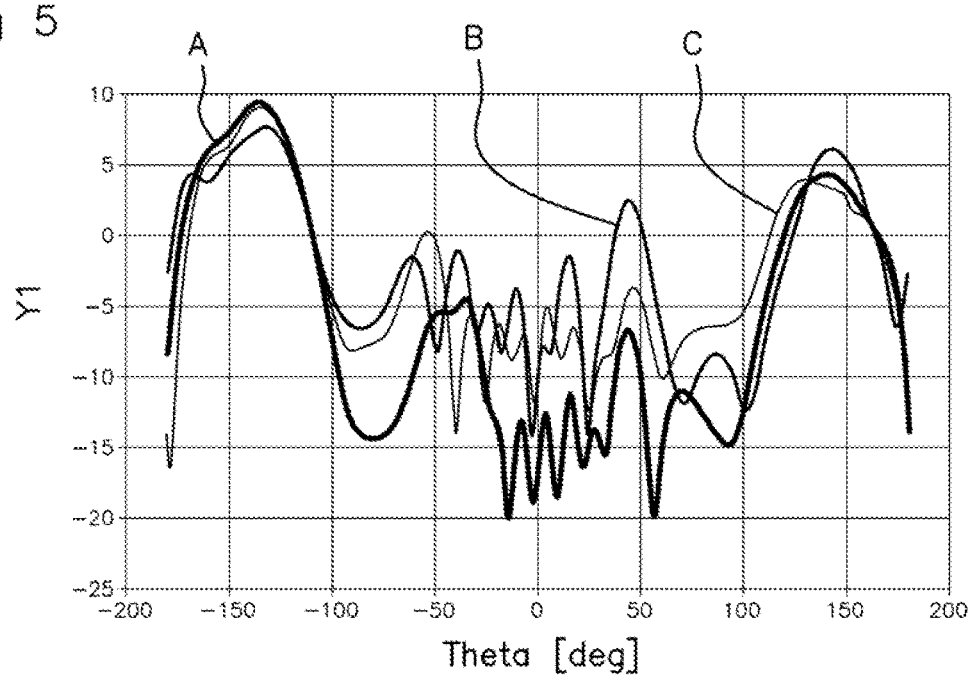
FIG. 5 shows three radiation curves around the handle according to the printed circuit board and ultra-high-frequency antenna assemblies, which are respectively obtained by a handle without interconnection, a handle according to the prior art with interconnection but without a quarter-wave line or insulating coating and a handle according to an aspect of the present invention.

Several models were then developed producing the radiation referenced in FIG. 5 so as to better identify unwanted radiation and to see if the solution proposed by an aspect of the present invention was effective.

Referring to FIG. 1, FIG. 2, FIG. 3C, FIG. 4A, FIG. 4B and FIG. 5 for references, the first model A consisted of a printed circuit board 3 and an ultra-high-frequency antenna 2 forming a first assembly without interconnection. In the ring of radiation surrounding the first assembly, the rear part oriented inside the vehicle is not very large. The reason is that, for this model A, the thickness of the opening is sufficient to limit the radiation toward the inside of the vehicle.

The second model B consisted of a printed circuit board 3 and an ultra-high-frequency antenna 2 forming a second assembly with interconnection, because the cable or cables 7 connecting the assembly to an electronic control unit 15 are present for this second model.

Figure 4A:
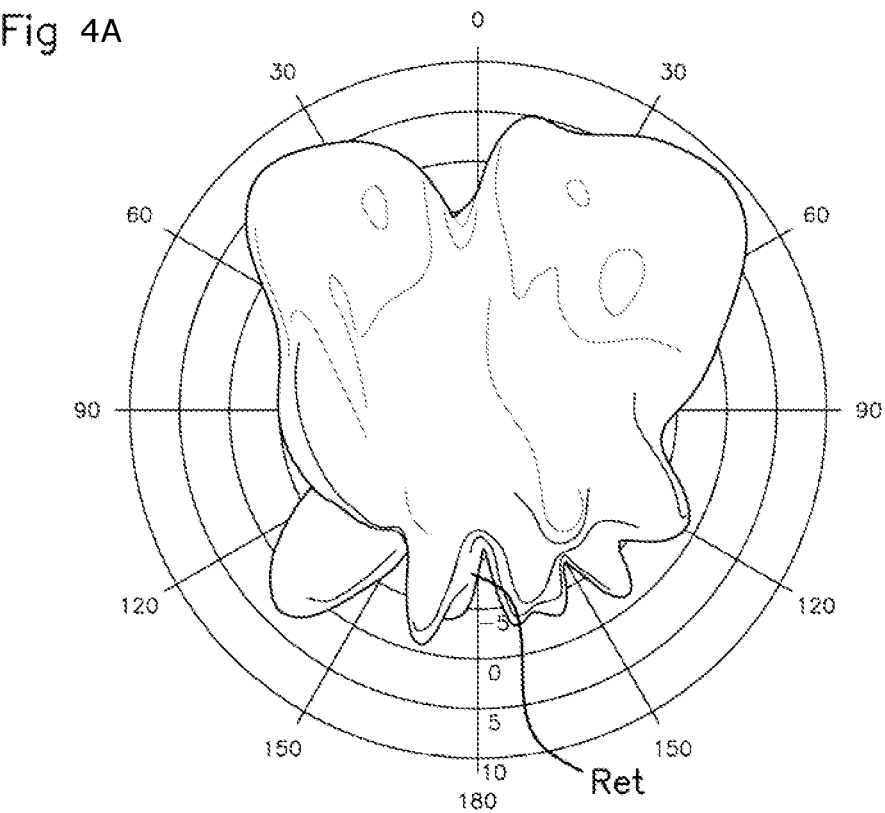
FIG. 4A shows the radiation obtained by a handle according to the prior art.

In the ring of radiation surrounding the second model B, analogous to the radiation shown in FIG. 4A, the rear part Ret of the radiation oriented inside the vehicle is significantly increased compared to the ring of the first assembly and is large, this being able to be due only to the presence of the interconnection, therefore of the cable or cables 7.

The third model C is in accordance with an aspect of the present invention and consisted of a printed circuit board 3, an ultra-high-frequency antenna 2 forming a third model with interconnection, but the cable or cables 7 connecting the printed circuit board of the third model C to an electronic control unit have a quarter-wave line or a section 9a covered by being surrounded by an electromagnetically insulating coating 16.

Figure 4B:
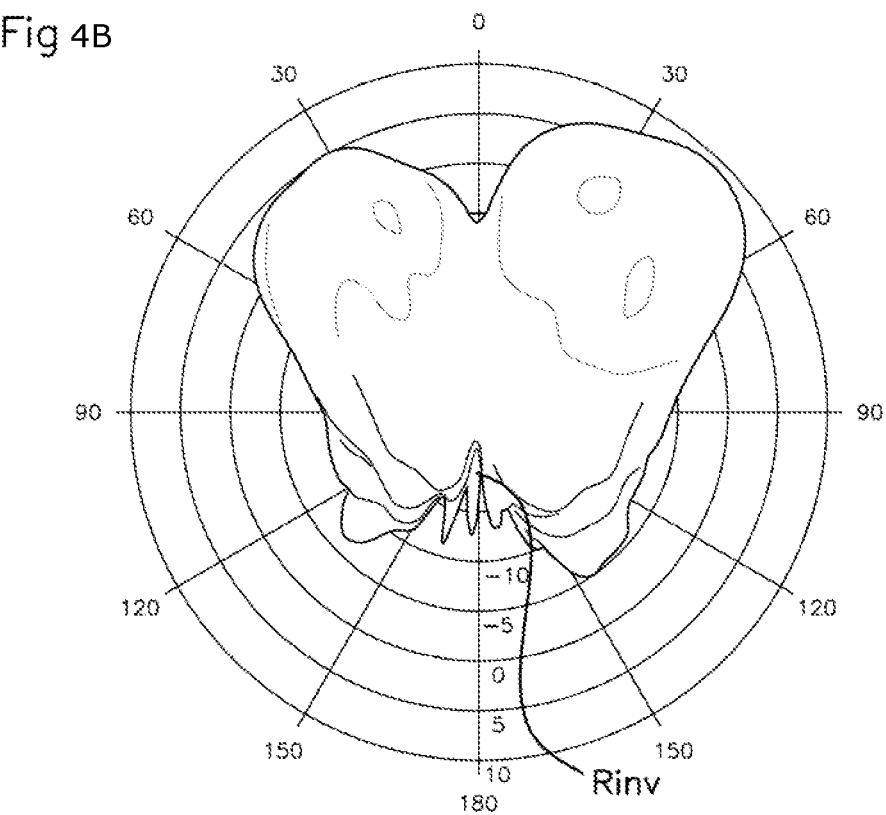
FIG. 4B shows a handle according to an aspect of the present invention with an interconnection having a quarter-wave line or an electromagnetically insulating coating, the radiation in FIG. 4B according to an aspect of the present invention being limited toward the inside compared to the radiation of FIG. 4A obtained by a handle according to the prior art.

It can be seen in FIG. 4B that in the radiation released by such a third model C, the rear part Rinv of the radiation oriented inside the vehicle is significantly reduced compared to the rear part Ret of the ring of the second model B and is substantially equivalent to that of the first model A, which shows that the presence of a quarter-wave line or of a covered section 9a in the interconnection reduces the radiation of electromagnetic waves toward the inside of the motor vehicle, this being the desired goal.

FIG. 4A and FIG. 4B therefore respectively show a 3D radiation pattern for a handle 6 according to the prior art and a handle 6 according to an aspect of the present invention, respectively. In these two figures, the angles define the direction of the radiation, a radiation toward angles close to 180°, by being between −130° and +130°, being a radiation directed toward the inside of the vehicle.

FIG. 4A shows increased radiation Ret toward the inside of the door 8 caused by the electrical connecting cable or cables 7 compared to the radiation Rinv toward the inside for a handle 6 according to an aspect of the present invention shown in FIG. 4b.

FIG. 3A shows a non-limiting embodiment of the invention of a section 9 having a length equal to one quarter of said predetermined wavelength $\lambda$. This section 9 or quarter-wave line extends at 90° with a range of variation of +/−30° around this value compared to the remainder of said at least one connecting cable 7, the section 9 forming a loop.

This is shown with a minimum of electronic elements, namely a printed circuit board 3 and an ultra-high-frequency antenna 2 having means for transmitting and receiving a signal at a predetermined wavelength $\lambda$, therefore without a device for detecting the approach of and/or contact by a user or a casing 5.

In FIG. 2, the loop 9 can define a space with respect to its two branches. The two branches can have a maximum spacing between them of less than one fifth of the predetermined wavelength with a tolerance of +/−20% around this value.

Conversely, in FIG. 3A, the loop 9 has two branches flattened against each other. In both cases, the quarter-wave line loop consists of a round trip by at least one connecting cable 7 over a distance equal to one quarter of the wavelength $\lambda$ of the transmitted or received signal.

In FIG. 3A, the quarter-wave line loop is positioned as being adjacent to the printed circuit board 3 comprising the ultra-high-frequency antenna, this not being limiting. The quarter-wave line loop can in fact be positioned differently on said at least one electrical cable 7. For example, the section 9 projecting from the remainder of said at least one connecting cable 7 can be located in a first quarter of the length of said at least one connecting cable 7 starting from the printed circuit board 3.

FIG. 3B shows a first sub-embodiment that is an alternative to the first embodiment. In this first sub-embodiment, the connecting cable or cables 7 can comprise a part in the form of a microstrip 7a extending against one face of the printed circuit board 3. The microstrip 7a then incorporates the section 9 projecting from the remainder of said at least one connecting cable 7, this projecting section 9 being of a length equal to one quarter of the wavelength $\lambda$ of the wave signal of the transmitted or received signal.

In FIG. 3B, the printed circuit board 3 is of parallelepipedal shape and has a thickness h. The printed circuit board 3 carries the microstrip 7a on one of its largest faces, while the microstrip 7a has a length L and a width W. The projecting section 9 is located halfway along the microstrip 7a, this not being limiting.

In FIG. 3C, for the second embodiment of the present invention, a metal sleeve 16 is shown as the electromagnetically insulating coating. The metal sleeve 16 advantageously covers or envelops the section 9a at a distance. This metal sleeve 16 can be positioned anywhere along the length of a connecting cable 7. It is the length of the covered section 9a that is equal to one quarter of the wavelength $\lambda$ of the transmitted or received signal.

FIG. 5 shows three radiation curves as a function of a positioning around the door that is quantified in terms of angle between −180° and +180° for, respectively, the first model A, which has squares, the second model B according to prior art, which has circles, and the third model C according to an aspect of the present invention, which has no respective sign, these three models having been explained above. The angles of the rear radiation for FIGS. 4A and 4B were between −130° and +130°, while the angles of the rear radiation for FIG. 5 are between −50° and +50°.

For an angle of 50°, the curve for the second model B according to the prior art with interconnection shows a strong radiation amplitude of about 3 dBi, while the curve for the third model C according to an aspect of the present invention shows an amplitude similar to that of the curve for the first model A without interconnection of −4 dBi and −7 dBi, respectively.

This applies to the angle range between −50° and +50°, for which the radiation of the second assembly is stronger than the radiation of the first and third assemblies.

As particularly clearly visible in FIG. 2, the ultra-high-frequency antenna 2, the device for detecting the approach of and/or contact by a user and the printed circuit board 3 can be housed in a sealed casing 5. This applies to the microstrip 7a when this microstrip 7a is present and is applied against one face of the printed circuit board 3.

In this case, the sealed casing 5 and the handle 6 can comprise a passage respectively toward the outside of the casing 5 and the outside of the handle 6 for the remainder of said at least one connecting cable 7.

Referring more particularly to FIG. 6, an aspect of the present invention relates to an opening 8 of a motor vehicle 14 comprising a handle 6 on a face referred to as outer face, the opening 8 comprising automatic locking and unlocking means, the handle 6 being as described above.

The connecting cable or cables 7 pass through the opening 8, the section 9 projecting from the remainder of said at least one connecting cable 7 or the section 9a coated with an electromagnetically insulating coating 16, advantageously a sleeve, being located inside the opening 8 toward its inner face opposite to its outer face or in the handle 6.

The connecting cables 7 are directed toward an electronic control unit 15 incorporated in the motor vehicle 14 and located substantially in the middle zone of the motor vehicle so as to be approximately at an equal distance from all the handles, opening and closing of which are controlled remotely, this possibly also not being the case.

FIG. 6 merely shows, for each connecting cable 7, projecting sections 9 having a length equal to one quarter of said predetermined wavelength λ, that is to say according to the first embodiment of the present invention, but the alternative of the first embodiment and the second embodiment having a covered section 9a can also be implemented.

As shown in FIG. 6, an aspect of the present invention relates to an assembly of an electronic control unit 15 responsible for locking and unlocking at least one opening 8 of a motor vehicle 14 and at least one opening 8 as described above.

The connecting cable or cables 7 connect the printed circuit board 3 inside each handle 6 to the electronic control unit 15 located at a distance from each handle 6. The means for automatically locking and unlocking the opening 8 are controlled by activation means of the electronic control unit 15. An aspect of the present invention relates finally to a motor vehicle 14 comprising such an assembly described above.

FIG. 6 shows a motor vehicle 14 comprising three handles 6 for an opening 8 including two handles 6 for a front door 8 and one handle 6 for a rear trunk. One or more connecting cables 7 connect each printed circuit board 3 inside each handle 6 to an electronic control unit 15.

The invention claimed is:

1. A handle for a motor vehicle opening, equipped with an ultra-high-frequency antenna for transmitting and receiving a signal at a predetermined wavelength, with a device for detecting the approach of and/or contact by a user, with a printed circuit board and with at least one connecting cable intended for electrically connecting the printed circuit board to an electronic control unit of the motor vehicle, said at least one connecting cable having a section projecting from the remainder of said at least one connecting cable, a length of the projecting section being equal to one quarter of said predetermined wavelength with a tolerance of +/−20%, wherein the section projecting from the remainder of said at least one connecting cable extends at 90° with a range of variation of +/−30° around this value compared to the remainder of said at least one connecting cable, the projecting section forming a loop to reduce electromagnetic radiation from said at least one connecting cable oriented inside the motor vehicle.

2. The handle as claimed in claim 1, wherein the loop has two branches flattened against each other or two branches having a spacing between them of less than one fifth of the predetermined wavelength with a tolerance of +/−20%.

3. The handle as claimed in claim 1, wherein the section projecting from the remainder of said at least one connecting cable is located in a first quarter of the length of said at least one connecting cable starting from the printed circuit board.

4. The handle as claimed in claim 1, wherein said at least one cable comprises a part in the form of a microstrip extending against a face of the printed circuit board, the microstrip incorporating the section projecting from the remainder of said at least one connecting cable.

5. The handle as claimed in claim 1, wherein the ultra-high-frequency antenna, the device for detecting the approach of and/or contact by a user and the printed circuit board are housed in a sealed casing, the sealed casing and the handle comprising a passage respectively toward the outside of the casing and the outside of the handle for said at least one connecting cable.

6. A motor vehicle opening comprising a handle on an outer face, the opening comprising an automatic locking and unlocking device, wherein the handle is as claimed in claim 1, said at least one connecting cable passing through the opening, the section of said at least one connecting cable being located inside the opening toward its inner face opposite to its outer face or being housed in the handle.

7. An assembly of an electronic control unit responsible for locking and unlocking at least one opening of a motor vehicle and at least one opening, wherein the opening is as claimed in claim 6, said at least one connecting cable connecting the printed circuit board to the electronic control unit, the automatic locking and unlocking device of the opening being controlled by the electronic control unit.

8. A motor vehicle, an assembly as claimed in claim 7.

9. The handle as claimed in claim 3, wherein the loop has two branches flattened against each other or two branches having a spacing between them of less than one fifth of the predetermined wavelength with a tolerance of +/−20%.

10. The handle as claimed in claim 2, wherein the section projecting from the remainder of said at least one connecting cable is located in a first quarter of the length of said at least one connecting cable starting from the printed circuit board.

* * * * *